(12) United States Patent
Hecht et al.

(10) Patent No.: US 10,397,679 B2
(45) Date of Patent: Aug. 27, 2019

(54) TRANSPARENT TOUCHSCREEN PARAMETRIC EMITTER

(71) Applicant: Turtle Beach Corporation, San Diego, CA (US)

(72) Inventors: David Hecht, San Diego, CA (US); Brian Kappus, San Diego, CA (US); Keith Chipperfield, San Diego, CA (US); Mark W. Norris, San Diego, CA (US); Elwood Grant Norris, San Diego, CA (US)

(73) Assignee: TURTLE BEACH CORPORATION, San Diego, CA (US)

( * ) Notice: Subject to any disclaimer, the term of this patent is extended or adjusted under 35 U.S.C. 154(b) by 0 days.

(21) Appl. No.: 15/866,428

(22) Filed: Jan. 9, 2018

(65) Prior Publication Data

US 2018/0199124 A1 Jul. 12, 2018

Related U.S. Application Data

(60) Provisional application No. 62/444,317, filed on Jan. 9, 2017.

(51) Int. Cl.
| | |
|---|---|
| *H04R 9/06* | (2006.01) |
| *H04R 1/02* | (2006.01) |
| *G06F 3/041* | (2006.01) |
| *H04M 1/03* | (2006.01) |
| *G06F 3/043* | (2006.01) |
| *H04R 19/02* | (2006.01) |
| *H04R 3/00* | (2006.01) |

(52) U.S. Cl.
CPC ........... *H04R 1/028* (2013.01); *G06F 3/0412* (2013.01); *G06F 3/0414* (2013.01); *G06F 3/0436* (2013.01); *H04M 1/03* (2013.01); *H04R 19/02* (2013.01); *H04R 2217/03* (2013.01); *H04R 2499/11* (2013.01); *H04R 2499/15* (2013.01)

(58) Field of Classification Search
CPC ................ H04R 1/028; H04R 2217/03; H04R 2499/11; H04R 19/02; G06F 3/0412; G06F 3/0414; G06F 3/0436; H04M 1/03
USPC .......................................... 381/334, 113, 114
See application file for complete search history.

(56) References Cited

U.S. PATENT DOCUMENTS

| | | | |
|---|---|---|---|
| 2010/0013797 A1* | 1/2010 | Kim ...................... | G06F 3/0436 345/176 |
| 2016/0124460 A1* | 5/2016 | Murata ................... | G06F 3/044 345/174 |
| 2016/0373864 A1 | 12/2016 | Hecht | |
| 2016/0373964 A1* | 12/2016 | Nagasaka ............. | H04W 28/08 |

OTHER PUBLICATIONS

International Search Report and Written Opinion for PCT/US2018/013032 dated Apr. 13 2018; 72 pages.

\* cited by examiner

*Primary Examiner* — Xu Mei
*Assistant Examiner* — Ammar T Hamid
(74) *Attorney, Agent, or Firm* — Sheppard, Mullin, Richter & Hampton LLP

(57) ABSTRACT

An integrated transparent ultrasonic audio speaker and touchscreen panel, includes a first transparent layer comprising a first base layer and a first conductive layer; and a second transparent layer disposed adjacent the first transparent layer, the second transparent layer comprising a second base layer and a second conductive layer; wherein the second transparent layer is a touchscreen.

15 Claims, 13 Drawing Sheets

TRANSPARENT TOUCHSCREEN PARAMETRIC EMITTER

CROSS REFERENCE

This application claims priority to U.S. Provisional Application No. 62/444,317, filed on Jan. 9, 2017, which is incorporated herein by reference in its entirety.

TECHNICAL FIELD

The present disclosure relates generally to parametric speakers. More particularly, some embodiments relate to transparent, touchscreen ultrasonic emitters.

BACKGROUND OF THE DISCLOSURE

Parametric sound is a fundamentally new class of audio that relies on a non-linear mixing of an audio signal with an ultrasonic carrier. One of the key enablers for this technology is a high-amplitude, efficient ultrasonic source, which is referred to here as an emitter or transducer. Ultrasonic emitters can be created through a variety of different fundamental mechanisms, such as piezoelectric, electrostatic, and thermoacoustic, to name a few. Electrostatic emitters are generally capacitive devices consisting of two conductive faces with an air gap, where at least one of the conductive faces has a texture that is critical to the functionality of the emitter.

Non-linear transduction results from the introduction of sufficiently intense, audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

BRIEF DESCRIPTION OF THE DRAWINGS

Embodiments of the technology described herein include an integrated transparent ultrasonic audio speaker and touchscreen panel, that can include: a first transparent layer comprising a first base layer and a first conductive layer; and a second transparent layer disposed adjacent the first transparent layer, the second transparent layer comprising a second base layer and a second conductive layer; wherein the second transparent layer is a touchscreen.

Other embodiments include a method for operating an integrated transparent ultrasonic audio speaker and touchscreen panel, that includes: for a conductive layer having a plurality of overlapping rows and columns of conductive material, scanning possible combinations of rows and columns one at a time to detect the presence of a touch; and while the scanning is occurring, driving remaining rows and columns of the conductive layer to produce an ultrasonic audio signal. The driving can include driving all rows and columns of the conductive layer to produce an ultrasonic signal, and the scanning can include measuring a driving signal in the scanned row and column to determine whether the driving signal indicates the presence of a touch.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the included figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to devices depicted therein using terms such as "top," "bottom," "side," "with" or "height," such references are merely descriptive and do not imply or require that the disclosed technology be implemented or used in a particular spatial orientation unless explicitly stated otherwise.

Figure 1:
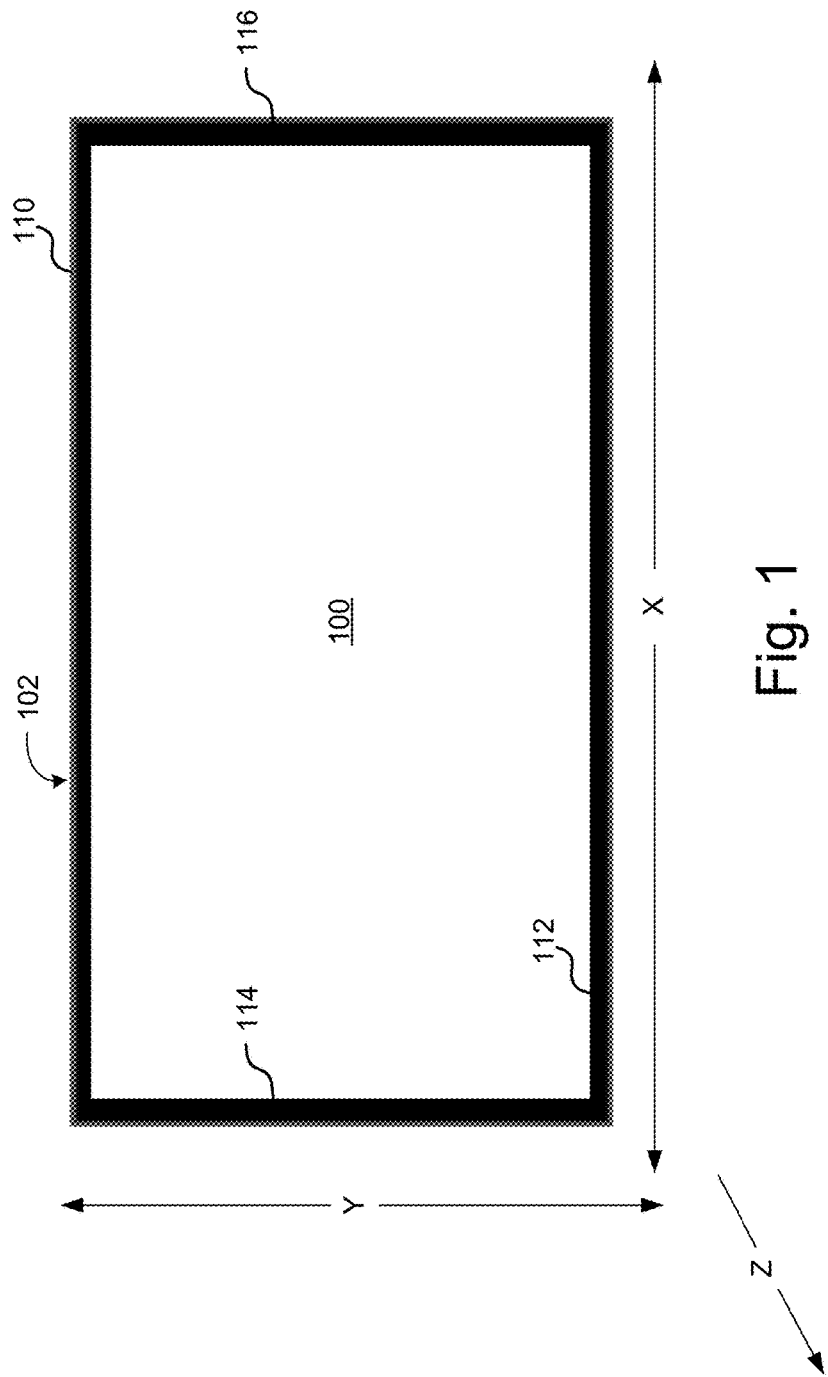

FIG. 1 is a diagram illustrating an example plan view of a display overlay including a transparent emitter with a bezel incorporating infrared or camera-based touch screen functionality in accordance with one embodiment of the systems and methods described herein.

Figure 2:
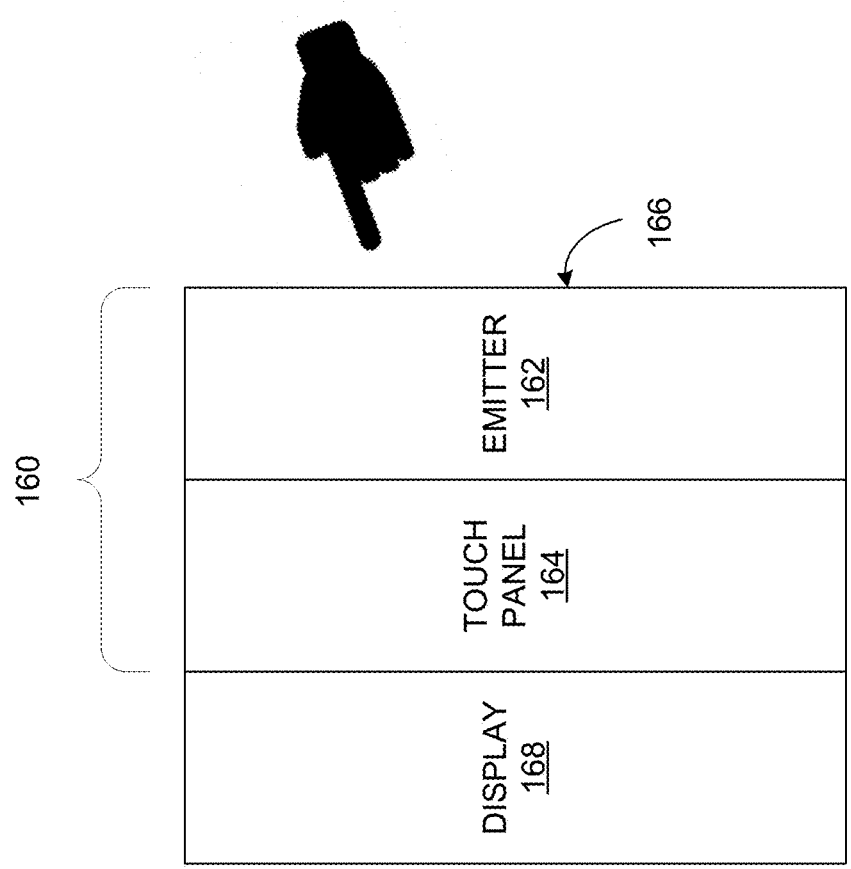

FIG. 2 is a diagram illustrating a cross-sectional view of an example transparent touchscreen incorporating resistive or force-based touch technology with a transparent emitter in accordance with one embodiment of the systems and methods described herein.

Figure 3:
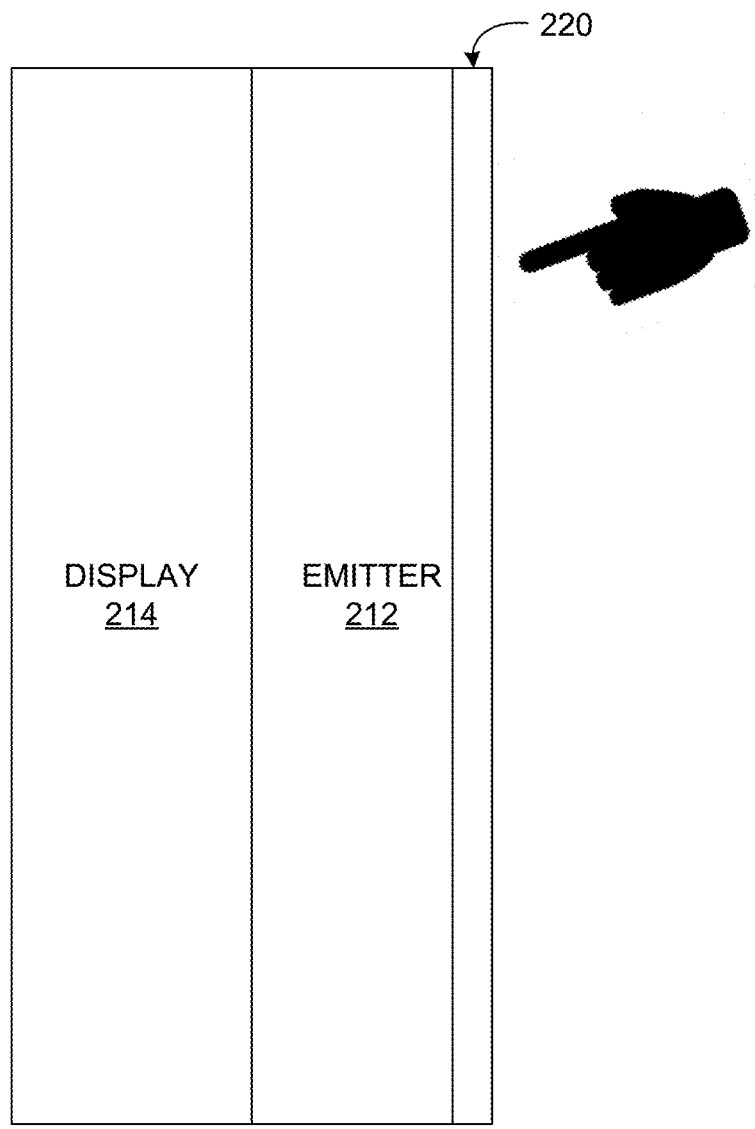

FIG. 3 is a diagram illustrating a cross-sectional view of an example transparent touchscreen incorporating a surface capacitive touch panel with a transparent emitter in accordance with one embodiment of the systems and methods described herein.

Figure 4:
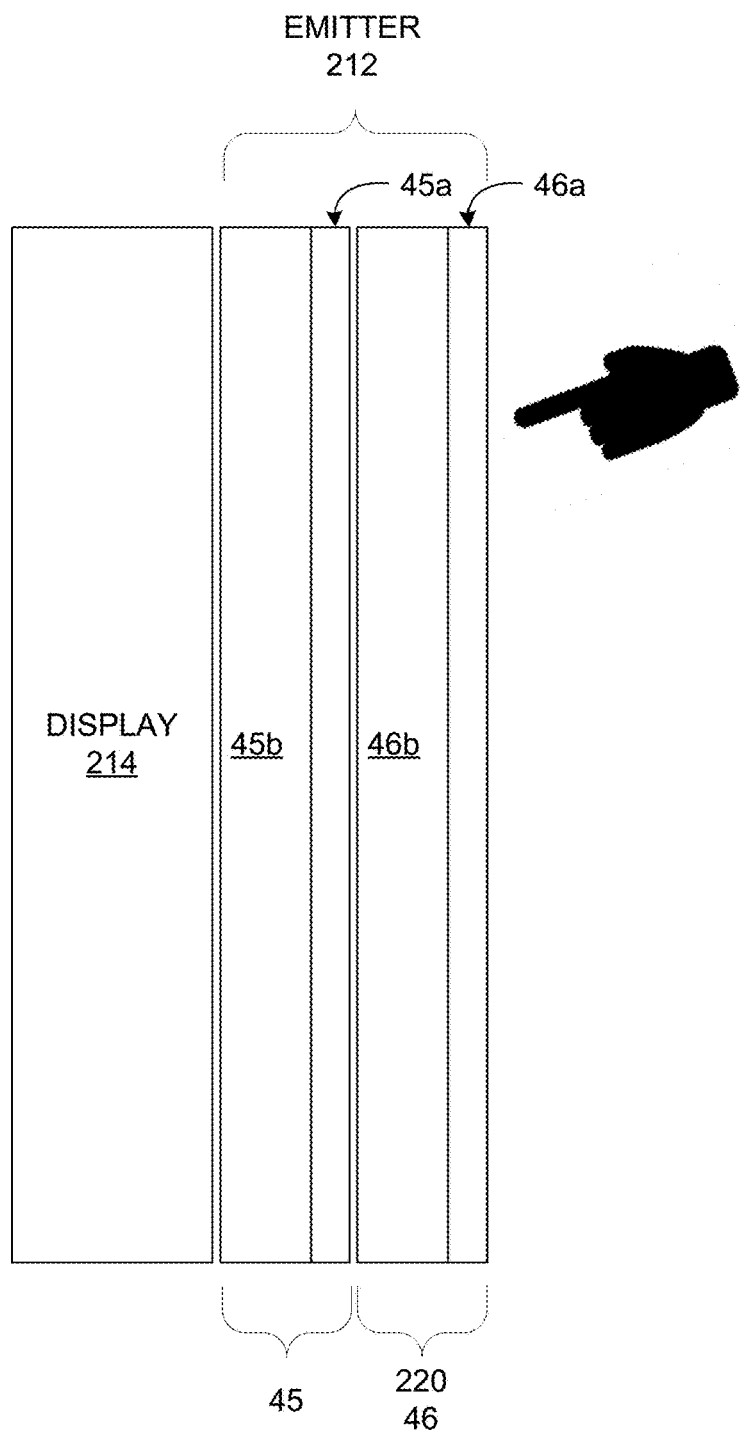

FIG. 4 is a diagram illustrating an example emitter in which the outer transparent conductive layer of the transparent emitter can be implemented to serve as a capacitive touch panel in accordance with one embodiment of the systems and methods described herein.

Figure 5:
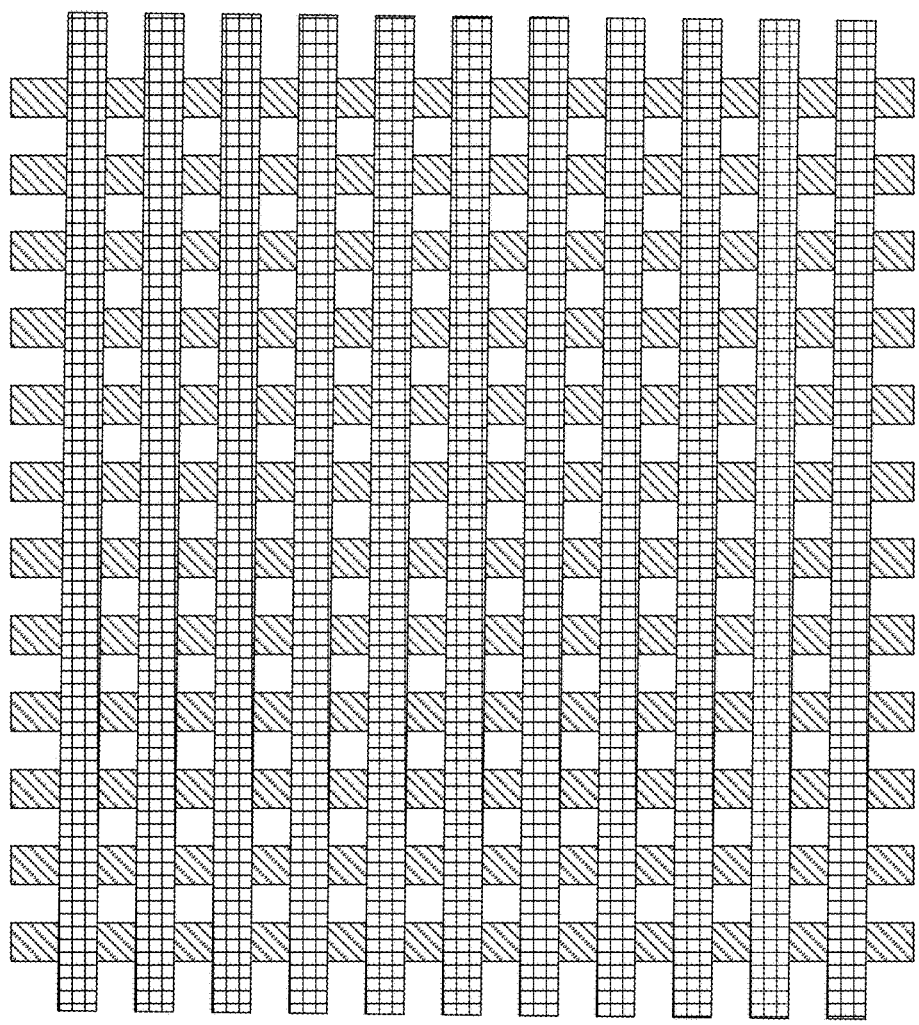
Figure 6:
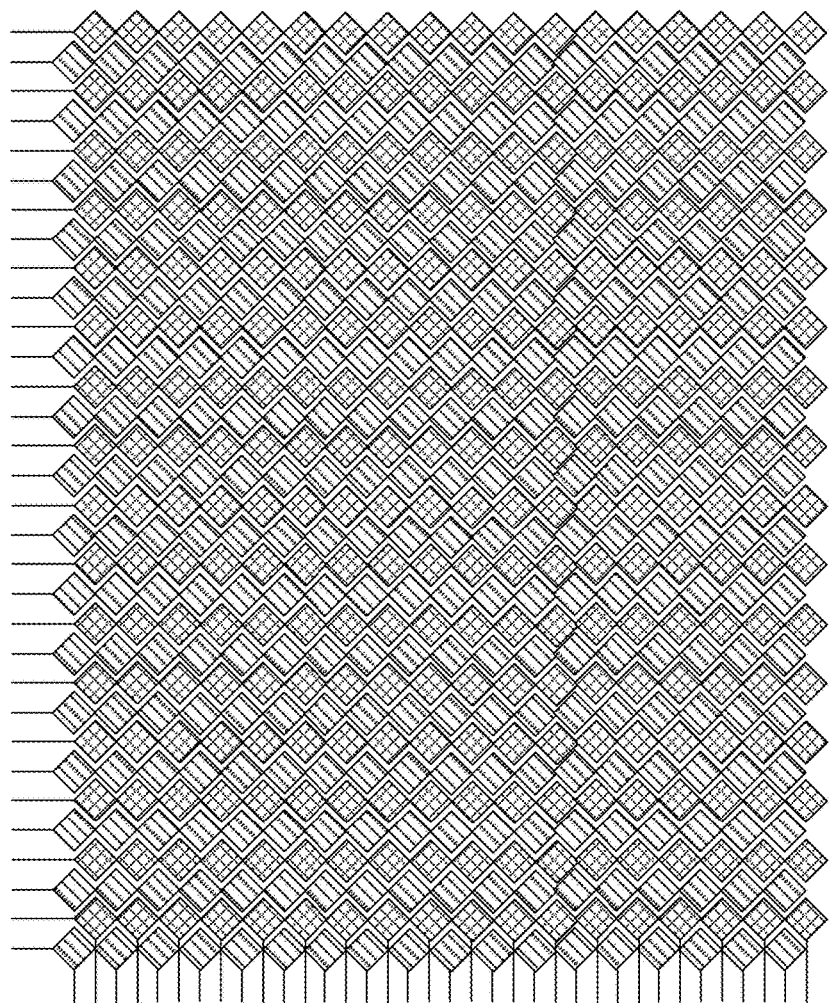

FIGS. 5 and 6 are diagrams illustrating examples of electrical patterning to form a procap touch panel as part of the emitter in accordance with one embodiment of the systems and methods described herein.

Figure 7:
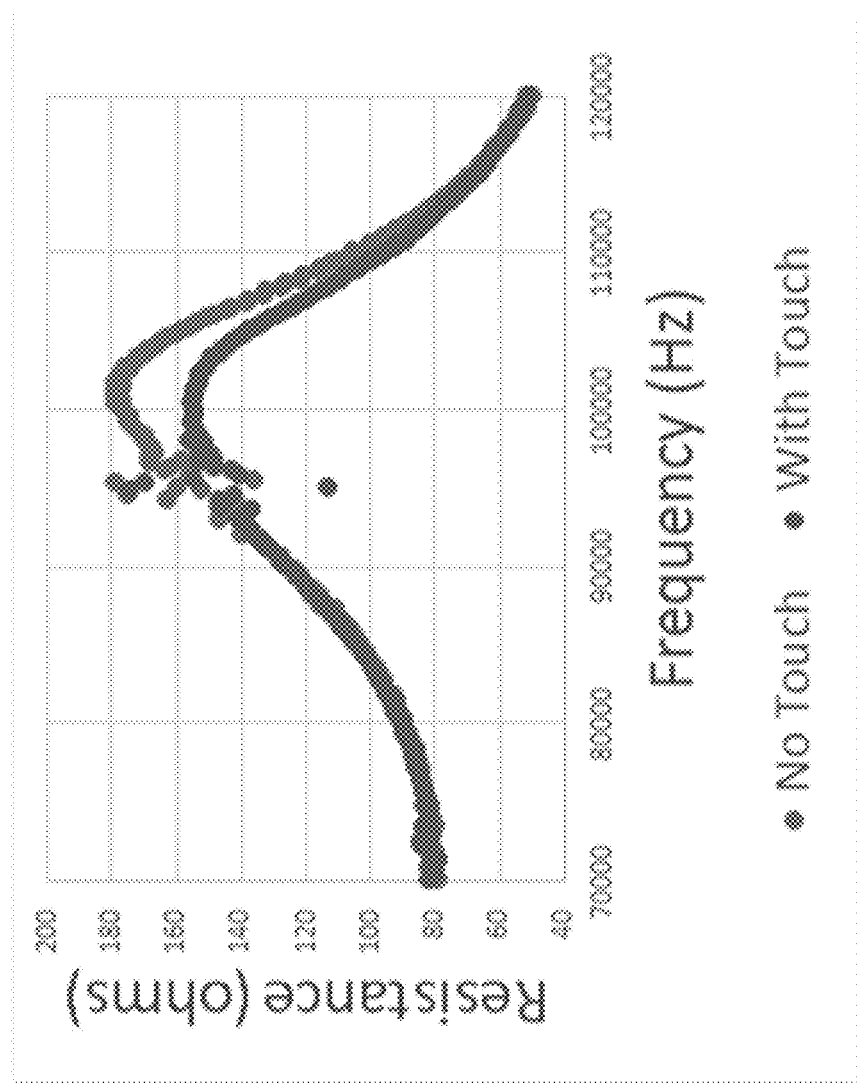

FIG. 7 is a diagram illustrating an example of changes in impedance with touch and without touch.

Figure 8:
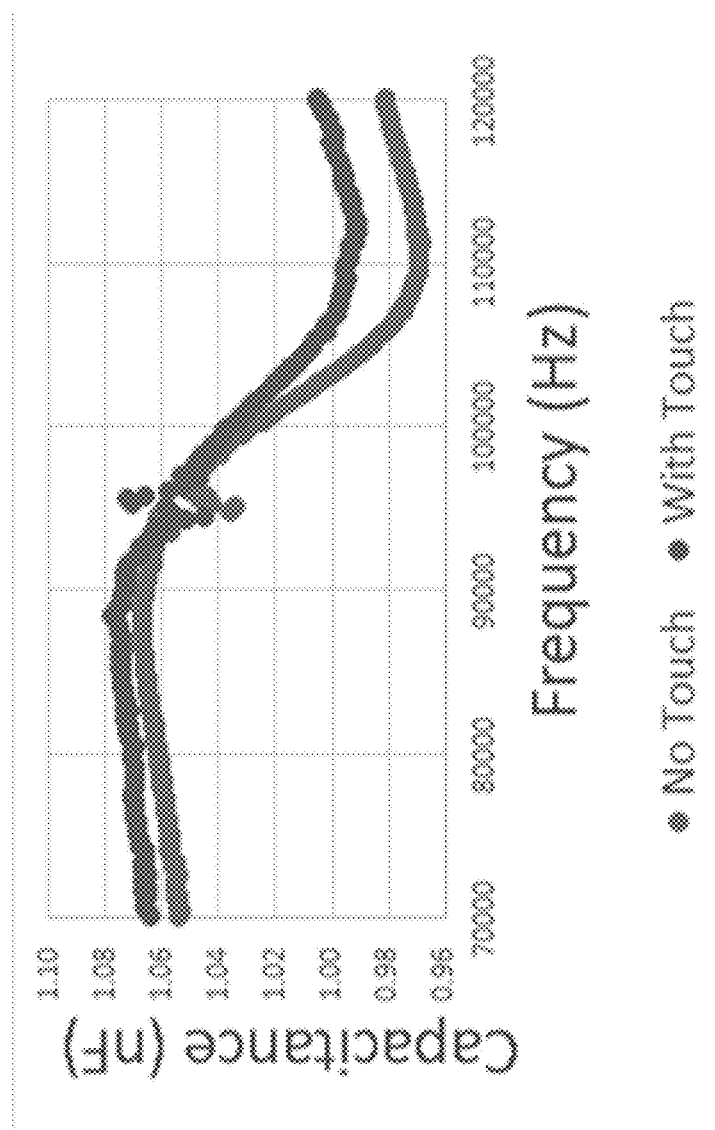

FIG. 8 is a diagram illustrating an example of changes in capacitance with touch and without touch.

Figure 9:
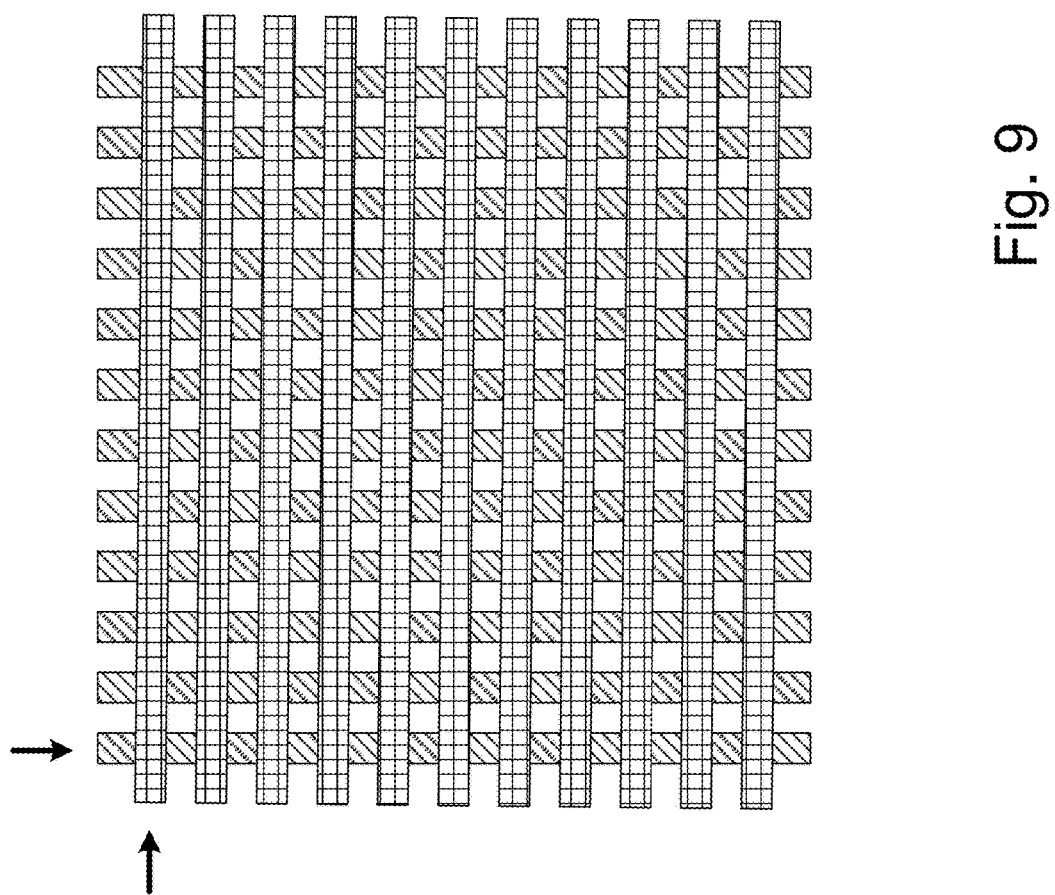
Figure 10:
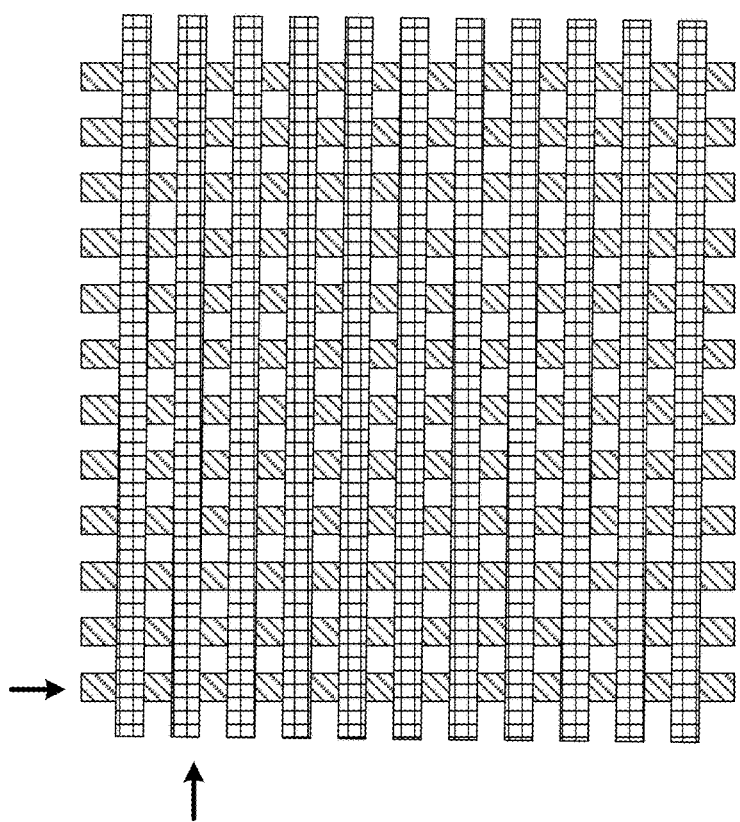

FIGS. 9 and 10 show an emitter being both driven for audio (all other rows and columns) and being scanned for touch (arrow at row and column of current scan).

Figure 11:
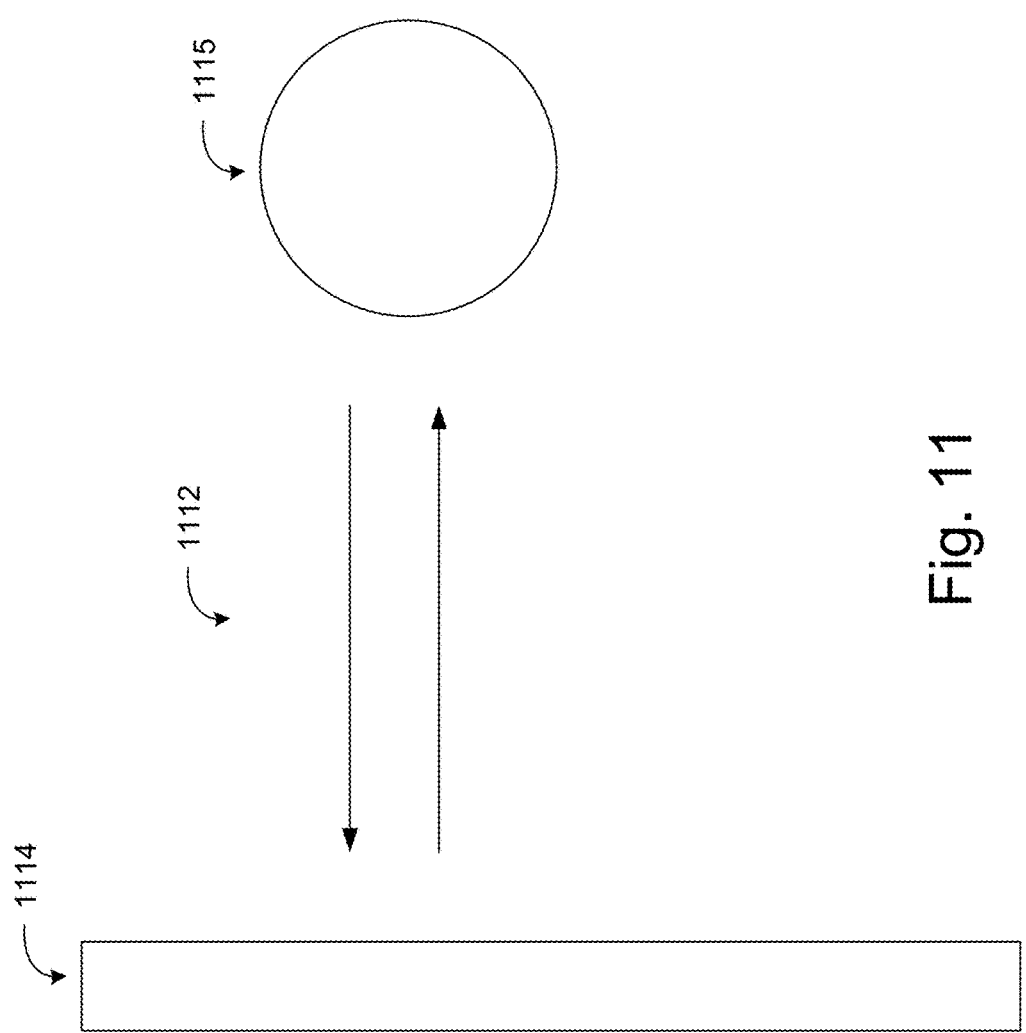

FIG. 11 illustrates an example of an emitter producing an ultrasonic pulse to create a transmit signal also receiving the reflected signal.

Figure 12:
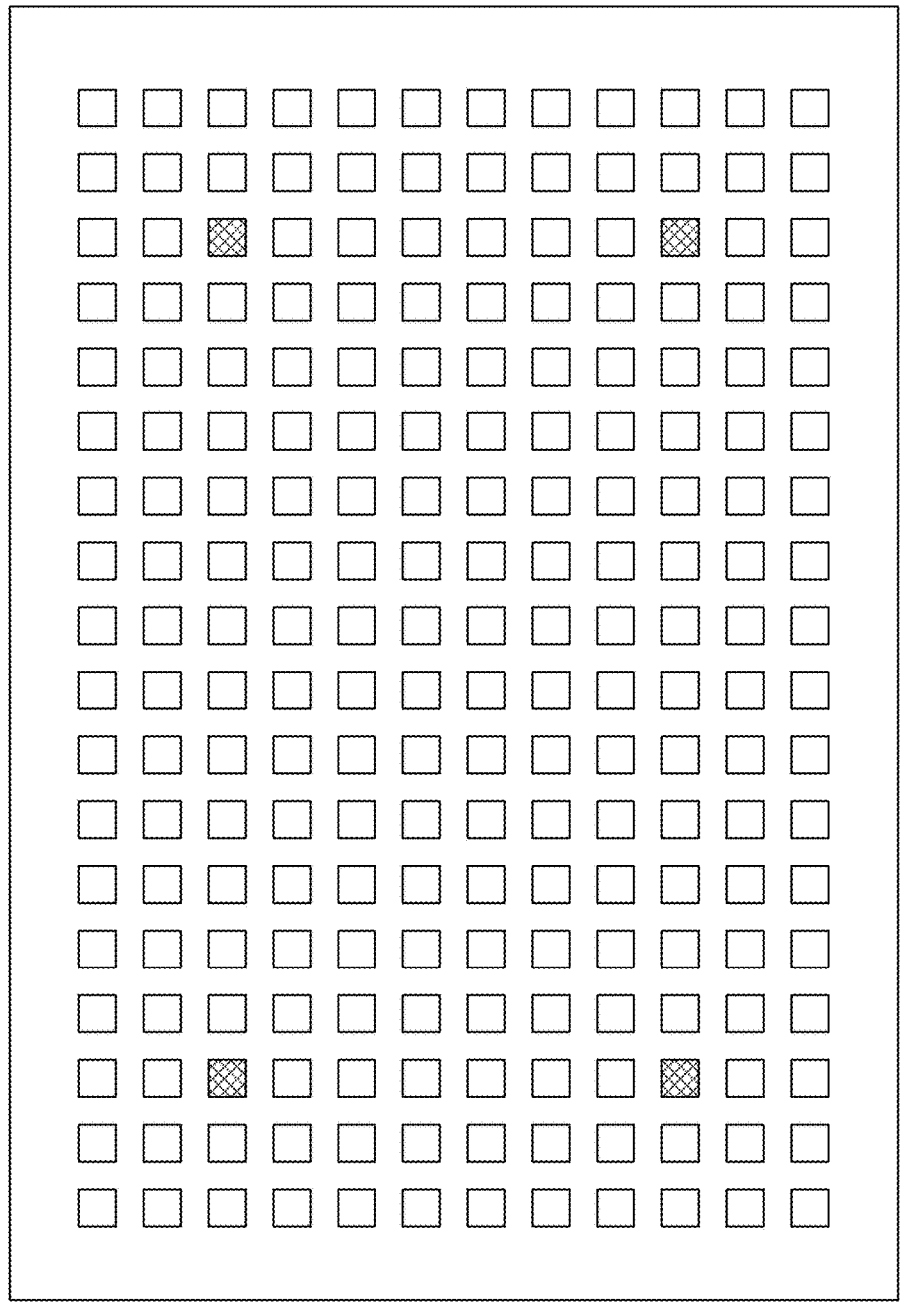

FIG. 12 is a diagram illustrating an example emitter formed by patterning a solid planar conductor on one side, and the other side is patterned as a plurality of discrete "emitters" in accordance with one embodiment of the systems and methods described herein.

Figure 13:
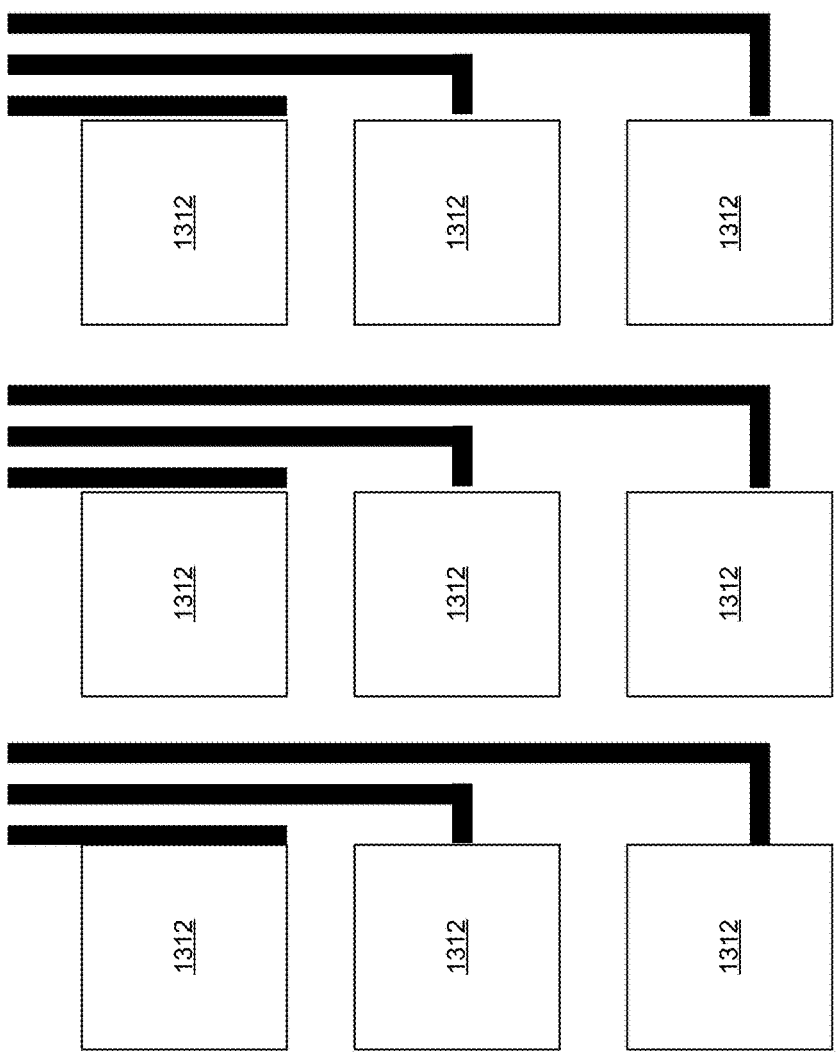

FIG. 13 illustrates an example in which discrete emitters are configured as an individually addressable unit (IAU) and can be connected to drive/detection circuitry via conductors such as, for example, a finely printed metallic bulbar.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the systems and methods described herein provide a touchscreen panel that can sense not just X and Y touch coordinates, but also Z touch information at a distance away from the touchscreen panel. In some embodiments, the touchscreen panel can detect Z information up to several meters from the panel. This can provide significant advantages over conventional touch panels, which can detect X and Y touch coordinates, but only provide weak Z detection (only up to ~10 cm). Such embodiments can be implemented to enable improved interaction with contention display devices, including, for example, gesture control and interaction with various content display devices.

Further embodiments can be implemented to provide a transparent, touchscreen ultrasonic audio transducer for a variety of different applications. Certain embodiments provide, for example, a transparent, touchscreen ultrasonic emitter for ultrasonic carrier audio applications. In various embodiments, the ultrasonic emitter is made using conductive layers or regions on glass or other transparent material, separated by a transparent insulating layer, so that the emitter has a high degree of transparency. Examples of transparent parametric emitters with which the touchscreen technology disclosed herein may be implemented are disclosed in U.S. Pat. No. 8,976,997, filed on Jul. 14, 2014, titled Transparent Parametric Emitter; U.S. Pat. No. 9,258,651, filed on Oct. 17, 2013, titled Transparent Parametric Transducer and Related Methods; U.S. Pat. No. 9,351,083, filed on Jan. 23, 2015, titled Transparent Parametric Emitter; each of which are incorporated by reference herein in their entirety as if reproduced in full below.

Accordingly, in some embodiments, the touchscreen emitter is sufficiently transparent such that it can be positioned on or in front of the display screen of a content playback or display device to provide directional audio to a user of the device. In other embodiments, the emitter can be provided in place of the display screen of a content playback or display device. Content display devices such as, for example, laptops, tablet computers, computers and other computing devices, smartphones, televisions, PDAs, mobile devices, mp3 and video players, digital cameras, navigation systems, point-of-sale terminals, thermostats, appliance control panels, and other content display devices are becoming smaller and lighter and are being designed with power saving features in mind.

Because of the shrinking size of such content devices, there is less room available in the device packaging to include audio speakers. Conventional audio speakers generally operate better with a resonating chamber, and also resonate at frequencies requiring a relatively large degree of movement from the speaker cone. Accordingly, sufficient space is required in the device packaging to accommodate such speakers. This can become particularly challenging with contemporary content devices in which displays, and hence the devices, are becoming increasing thin. Also contributing to this challenge is the fact that contemporary content devices are often designed such that the front face of the device is primarily occupied by the display screen, which is surrounded by only a small, decorative border. Thus, it has become increasingly more difficult to achieve desired audio output with conventional acoustic audio speakers given these dimensional constraints. Moreover, conventional acoustic audio speakers tend to not be highly directional. Therefore, it is difficult to 'direct' conventional audio signals exclusively to an intended listener location.

Therefore, in some embodiments, one or more transparent, touchscreen parametric emitters are provided. In further embodiments, these transparent, touchscreen parametric emitters may be disposed on the face of the device to allow parametric audio content to be provided to the device user(s). Further, in some embodiments, a transparent emitter can be positioned over part or all of the content device's display. In still further embodiments, a transparent emitter can be provided and used as (e.g., in place of) the display's protective cover (i.e., glass facing). Accordingly, in various embodiments, the transparent emitter is manufactured with materials providing sufficient light transmittance in the visible spectrum to allow satisfactory viewing by a user(s). For example, in some embodiments the light transmittance of the emitter in the visible spectrum is 50% or greater. In further embodiments, the light transmittance of the emitter in the visible spectrum is 60% or greater. In still further embodiments, the light transmittance of the emitter in the visible spectrum is 70% or greater. In still further embodiments, the light transmittance of the emitter in the visible spectrum is 80% or greater. As a further example, the light transmittance of the emitter in the visible spectrum is in the range of 70-90%. As yet another example, the light transmittance of the emitter in the visible spectrum is in the range of 75-85%. As still another example, the light transmittance of the emitter in the visible spectrum is in the range of 80-95%.

In various embodiments, touchscreen, transparent emitters are provided with touch functionality using a variety of technologies such as camera, infrared, resistive, surface capacitive, and single-layer projected capacitive touch technologies in combination with a transparent ultrasonic emitter. Further embodiments can provide a touchscreen, transparent emitter with a procap touch capability. Still further embodiments provide a touchscreen, transparent emitter that relies on the acoustic resonance of the structure for audio and touchscreen performance. Additional embodiments provide a touchscreen, transparent emitter with a "Z" touch functionality combined with a procap/transparent emitter structure. A touch panel can be provided with Z touch functionality as part of or independent of a transparent ultrasonic emitter.

In some embodiments, an edge-based touch screen solution is provided in combination with a transparent parametric emitter. FIG. 1 is a diagram illustrating an example plan view of the display overlay including a transparent emitter with a bezel incorporating infrared or camera-based touch screen functionality in accordance with one embodiment of the systems and methods described herein. The example in FIG. 1 includes a transparent ultrasonic emitter 100 surrounded by and edge-based touch screen detection system 102. In this and other examples used in this document, the X, Y, Z Cartesian coordinate system is used, in which the X direction is the direction along the width of the device the Y direction is direction along the height of the device, and the Z direction is a direction perpendicular to the planar surface of the device. This convention is adopted to facilitate description of the technology. The terms "width" and "height" do not require a particular orientation of the device, but again are provided merely to facilitate description of the technology. However, one of ordinary skill in the art after reading this description will understand that other descriptors can be used in place of the Cartesian coordinate system.

In this example, a plurality of emitters are provided along one of the X and one of the Y edges of the device and a corresponding plurality of detectors are provided along the opposite edges of the X and Y edges of the device. For example, consider an implementation in which emitters are provided along edges 110 and 114, and corresponding detectors are provided along edges 112 and 116. In this example Emitters along edges 110 and 114 emit energy that is detected by the detectors on the opposite edges 112 and 116. When the energy path is broken, as determined by a loss of signal at one or more of the detectors, this indicates that they touch activity is taking place. The X and Y coordinates of the sensors detecting a break in the energy path indicate the X, Y position on the screen of the touch activity.

Emitters can be implemented, for example, using light emitting diodes (LEDs), lasers, or other energy sources, and the detectors can include corresponding photo transistors, photodiodes or other corresponding detectors. In other embodiments, cameras or other like image sensors can be mounted about the periphery of the screen and used to detect changes in their detected images that would indicate the presence of a finger, stylus, or other pointing device intended to interact with the touchscreen display.

Edge solutions, such as that depicted in the example of FIG. 1, can be desirable because they can be implemented without interfering with the operation of the transparent emitter, and they can be also implemented with nothing in the visible area of the emitter.

In other embodiments, resistive or force based touchscreen technologies may be combined with a transparent emitter to provide a transparent touchscreen display. FIG. 2 is a diagram illustrating a cross-sectional view of an example transparent touchscreen incorporating resistive or force-based touch technology with a transparent emitter in accordance with one embodiment of the systems and methods described herein. With reference to FIG. 2, a touchscreen transparent emitter 160 includes a transparent ultrasonic emitter 162 and a resistive or force-based touch panel 164. This touchscreen transparent emitter 160 can be mounted or overlaid on the front of a display panel 168 to provide a touch-sensitive emitter/display. Touch panel 164 is preferably disposed behind transparent emitter 162 so as not to interfere with signals generated by and projected from emitter 162.

In embodiments such as that illustrated in FIG. 2, the transparent emitter 162 can be implemented using materials of sufficient flexibility such that pressure from touchscreen activities (such as by a user applying pressure to the outer surface 166 of transparent emitter 162) can cause sufficient pressure on resistive or force-based touch panel 164 to sense the touch activity. For example, transparent emitter 162 can be implemented using glass sheets that are sufficiently flexible to allow the force of the touch to be transmitted to the resistive or force-based touch panel 164. As another example, transparent emitter 162 can be implemented using mylar or other like flexible sheets to provide sufficient flexibility.

In yet other embodiments, a surface capacitive touch panel can be provided on an outer surface of the transparent emitter to provide the touchscreen functions. FIG. 3 is a diagram illustrating a cross-sectional view of an example transparent touchscreen incorporating a surface capacitive touch panel with a transparent emitter in accordance with one embodiment of the systems and methods described herein. In this example, transparent emitter 212 includes a surface-capacitive touch panel 220 for the touch-screen functions. The surface capacitive touch panel 220 can be implemented using a single transparent conductive layer that can be fabricated on the outermost layer of the transparent parametric emitter 212. In further embodiments, the outer transparent conductive layer of the transparent emitter can be implemented to serve as the capacitive touch panel 220. An example of this is shown in FIG. 4. In this example, the emitter 212 includes sheets 45 and 46, which in various embodiments are transparent sheets. Although sheets 45, 46 can be transparent, non-transparent materials can be used as well. For ease of discussion, the emitter configurations are described herein from time to time as transparent emitters. However, one of ordinary skill in the art will understand that for various applications, opaque emitters or emitters with varying levels of opacity can be provided as well. In such alternative embodiments, one or more of the sheets of the emitter can be made with opaque or semi-opaque materials.

Sheets 45, 46 in the illustrated example, each include two layers 45a, 45b and 46a, 46b, respectively. Sheet 45 in this example, includes a base layer 45b comprising glass or other like material. Sheet 45 also includes a conductive layer 45a provided in the illustrated example on the top surface of base layer 45b. Similarly, in this example, sheet 46 includes a base layer 46b comprising glass or other like material, and a conductive layer 46a provided in the illustrated example on the top surface of base layer 46b.

The conductive layers 45a, 46a can be a thin layer of conductive material deposited on their respective base layers 45b, 46b. For example, conductive layers 45a, 46a can comprise a conductive coating sprayed, evaporated, or otherwise deposited on base layers 45b, 46b. As a further example, the conductive layers 45a, 46a can comprise Indium Tin Oxide (ITO), Fluorine doped Tin Oxide (FTO), doped zinc oxide, transparent gold, so-called hybrid transparent conductive coatings, conductive polymers, metal oxides or other like conductive material coated onto the transparent substrate. Conductive layers 45a, 46a can also comprise a layer of carbon nanotube networks or Graphene or a combination thereof disposed on the transparent sheet.

Conductive layers 45a, 46a can also comprise a conductive sheet of material laminated or otherwise deposited on base layers 45b, 46b. For example, a conductive mylar or other like film can be laminated or otherwise deposited on base layers 45b, 46b. In still further embodiments, conductive layers 45a, 46a can comprise a doped conduction layer or diffusion layer of conductive material that has been diffused partially or completely into sheets 45, 46 to form conductive layers 45a, 46a. For example, gold or other conductive metals can be diffused into the glass to a desired depth and at a desired concentration to provide conductivity to a desired value (e.g. a desired value of ohms/square). Preferably, the conductive region/layer 45a, 46a has a high degree of transparency (e.g., greater than 80% or 90% in the visible spectrum, although other transparencies can be used) so as not to unduly adversely affect the overall transparency of the emitter.

In various embodiments, the outer conductive sheet of the emitter can be implemented as a capacitive touch screen. The conductive portions of the outer sheet (e.g., layer 46a) can be implemented as a conductive pattern to provide the touch screen functions in addition to the conductive pattern used for generating the ultrasonic audio signal.

In some embodiments, the capacitive touch panel 220 can be implemented as a projected capacitive (procap) touch panel. One reason embodiments may implement a procap touch panel is that the procap touch panel can detect multiple touches (e.g., multiple finger presses) simultaneously. In some embodiments, a capacitive or projected-capacitive touch panel can be layered on top of (e.g., on the outer surface of) the ultrasonic emitter provided that it is flexible enough to not materially interfere with ultrasonic emissions from the emitter. In other embodiments, the projected-capacitive touch panel can be formed as an integrated part of a transparent parametric ultrasonic emitter (i.e., so the touch panel and transparent emitter are the same structure). In further embodiments, the device can be implemented to include the capability to provide enhanced features that conventional procap touchscreens cannot perform, such as detection of z coordinates as well as z velocity.

In some embodiments, a touchscreen transparent emitter can be implemented by providing a procap touch panel layer at the outside of the emitter (such as in the example of FIG. 3) or by including a procap touch panel integrated into the outer portion of the transparent emitter (such as with the example illustrated in FIG. 4). In such configurations, procap touch panels can be implemented using any of a number of different possible configurations. In some embodiments, there is a set of conductive traces provided on only on a single surface of the touch panel. These are referred to as a single-sided procap. Such panels can typically do single touch sensing, or "1.5" touch (single touch plus pinch and zoom), but cannot do true multi-touch. To make this construction, a very thin film (e.g., a PET film) coated with a patterned transparent conductor could be laminated onto the outer surface of the transparent emitter. It is recognized that there are various other ways to construct this, either with a single-layer or two-layer (true multi-touch) procap touch panel. In some embodiments, this procap touch panel is created on the outer surface of a transparent emitter. In other embodiments, this procap touch panel can be laminated to the outer surface of the emitter. In embodiments where a thin emitter is desired, such as where it is layered on a display screen, for example, thin layers are desired. Because the surface of the transparent emitter will be oscillating at frequencies at or near the ultrasound carrier frequency, in some embodiments the procap touch panel and the emitter may be tuned to work at frequencies as distinct and separate from each other as possible to minimize the risk of interference between the two.

It is noted that incorporating touch using an outer layer laminated or otherwise added onto outside of the transparent emitter is likely to have some effect on the performance of the ultrasonic emitter. Accordingly, as noted above, in various embodiments the functionality of a capacitive or procap touch panel can be created as an integral part of the emitter without adding additional layers to the emitter. This can be accomplished by forming the conductive layer of the outer sheet of the emitter as a patterned conductor to implement the touchscreen capabilities. Particularly, in various embodiments the conductive layer on the outer sheet of the transparent emitter is electrically patterned into a series of rows and columns in a manner similar to that as provided on conventional capacitive touch panels. For example, in the case of the example of FIG. 4, an electrical pattern that can be used to provide the touchscreen detection can also be used to form the conductive layer 46a as part of sheet 46 of the emitter 212. As another example, the electrical pattern that can be used to provide touchscreen detection can also be used to form conductive layers 46a and 45a of the emitter 212.

FIGS. 5 and 6 are diagrams illustrating examples of electrical patterning to form a procap touch panel as part of the emitter. The example illustrated in FIG. 5 includes a plurality of rows and columns of conductors separated by a dielectric layer. At each point where a row overlaps a conductor a parallel plate capacitor is formed. This capacitor creates fringing electric fields, and these fields are disturbed by placing a finger in the proximity of the field. This mechanism is used to detect when and where the user touches the screen.

The example illustrated in FIG. 6 is a diamond pattern of alternating conductors, one advantage of the diamond pattern is it minimizes overlap areas of rows and columns. This can be beneficial as compared to the example of FIG. 5 because overlap areas cannot be modified by the approach of a finger, but they do contribute to RC time constant delays which should also be reduced or minimized. On the other hand, in some implementations a simple pattern of rows and columns may be preferred because the overlap areas contribute to the acoustic properties of the emitter.

Once the patterned transparent emitter is constructed, any of several different physical mechanisms can be used to detect a touch event. One method is that of conventional procap touch panels; which is when a finger approaches the intersection of a row/column trace, changes in the capacitance to ground of each trace (self-capacitance), or changes in the capacitance between the row/column (mutual capacitance) can both be used to detect a finger touch. However, in this unique design a second method exists because the emitter is also a resonant ultrasonic acoustic device. When a finger (or other touching instrumentality) is touched to an emitter, the acoustic and electrical properties of the emitter panel at that location changes. First, the finger (or other touching instrumentality) dampens the acoustic capability of the thin film to move at the frequency of the ultrasonic audio signal (the carrier for which is typically at or near the resonant frequency of the emitter). Touching a spot on the emitter will cause a decrease in the real part of the impedance at the resonance frequency, which is typically in the range of 40-200 kHz, most typically 80-100 kHz. A second effect is an increase in the capacitance of the emitter, as the finger pushes the thin film closer to the more rigid "backplate", thus increasing the capacitance. This effect will be present for any relative size of finger touch to emitter area, but the signal will be maximized when the finger touch area is as large (or larger) than the emitter area, and will get progressively smaller as the finger touch area becomes small relative to the emitter area. Consider an example embodiment in which the emitter is patterned into rows and columns that are 5 mm×5 mm, the finger touch should typically be comparable in area to that of each subdivided unit of the emitter itself.

To demonstrate this effect, a commercially available emitter was etched into sections that had a 1" conductive row on the backplate, and a 1" conductive column on the film. This led to a 1"×1" overlap area of effective emitter area. This emitter then had the real part of its impedance, as well as its capacitance, measured over a range of frequencies about its acoustic resonance point (which was about 100 kHz for this particular emitter). The emitter was measured both with and without the presence of a finger touch (the lower peak shows the results with the touch). The changes in impedance and capacitance are shown in FIGS. 7 and 8, respectively. The glitch around 96 kHz is an error in the measurement system due to a noisy DC to DC converter and should be disregarded. It is evident that indeed the real part of the impedance (resistance) is reduced at resonance, and the capacitance is increased.

It is evident from the data that the resistance decreases by approximately 13% while the capacitance increases by approximately 1%. Both of the signals should be easily detectable with plenty of signal to noise. It is noteworthy that a conventional procap touchpanel does not have the resistance signal available to it. The electronics and circuitry necessary to detect the change in resistance may be simpler and/or faster than the electronics needed to detect the change in capacitance. The use of these two unique signals may also have other benefits such as enhanced ability to detect not only existence of a touch or not, but also the touch pressure. It should be noted that the increase in capacitance due to a finger touch in this configuration is opposite in sign to the decrease in capacitance sensed by a finger touch on a traditional pro cap touch panel. Also, the magnitude of the change in capacitance is much greater here (about a part per hundred compared to the typical part per thousand).

In order to detect multiple X and Y touch coordinates simultaneously, every row and column is "scanned" within the time period required to report one or more touch events. In order to smoothly detect touch coordinates, they are ideally reported at a rate of at least 60 Hz. This leaves only ¹⁄₆₀'th second, or 17 ms to scan every junction of a row and/or column (node). Typically, touch panels utilize a 5 mm pitch between rows and/or columns, which enables the ability to resolve touches from fingers that are close together. For a typical 21" monitor that is 300×500 mm, this would provide 60×100 rows×columns, or 6000 nodes to scan. This leaves only 17 ms/6000, or approximately 3 µs to scan each node. There are conventional techniques that are known in the art to speed up the scan speeds for procap touch panels. These techniques can be applied equally to such an acoustic based touch panel. For example, the panel can be scanned in self-capacitive mode (which involves m+n scans) and then only in mutual capacitance mode (which involves m*n scans) only to resolve any issues.

In order to play audio and detect touch signals simultaneously, the touch panel portion will scan through all possible combinations of rows and columns looking for a touch, and do so one at a time. While that scan is occurring, the remaining rows/columns may be driven in parallel, to produce the ultrasonic audio signal. For example, FIGS. 9 and 10 show an emitter being both driven for audio (all other rows and columns) and being scanned for touch (arrow at row and column of current scan). The emitter scan progresses through each row/column combination in a designated order, while remaining rows/columns are driven with the audio signal. FIG. 9 shows the topmost row and leftmost column being scanned to check for a touch, while FIG. 10 shows the second row from the top and the leftmost column being scanned to check for a touch.

Depending on the implementation, locations that are being scanned can still be producing audio. This can be accomplished by measuring the driving signal in each row/column, rather than directly measuring impedance. If the panel is well-characterized, without touch present, the panel responds to drive in a well-known way. When touch is present, however, the emitter response in that location will change and the panel will respond differently to drive input. This could take the form of different voltage than expected, different frequency response, or different current draw.

Implementing a capacitive touch panel with a transparent ultrasonic emitter in various embodiments provides capabilities beyond what is possible with a conventional procap touchpanel. In addition to being able to detect both X and Y touch coordinates, the panel is capable of detecting both the z coordinate, as well as the z velocity of an approaching or receding object such as a hand. In various embodiments this may be accomplished by utilizing the emitter's ability to transmit and receive an ultrasonic pulse. This can be implemented in various embodiments regardless of whether the emitter is configured as or being used as an ultrasonic audio emitter.

Essentially, the patterned grid of rows and columns forms a 2-D grid of transparent ultrasonic emitters/receivers. When a row/column combination is pulsed with a short signal burst (e.g., at or near the resonant frequency), an acoustic ultrasonic pulse 1112 (FIG. 11) is transmitted into the air from the emitter 1114 to an object 1115. The acoustic signal will propagate forward in a tight "beam" until it is reflected/scattered by the object 1116 such as a hand or any other material with an acoustic impedance mismatch to air. Part of that signal will be reflected back towards the emitter 1114. When an ultrasonic acoustic signal, including a reflected ultrasonic signal, impinges upon an emitter, it creates a voltage signal appearing between the terminals at the same frequency as the acoustic signal. Therefore, the same emitter that produces the ultrasonic pulse that created the transmit signal can also receive the reflected signal. An example of this is shown in FIG. 11.

Due to the directional nature of ultrasonic signals, both the transmit and receive signals will be highly directional. As a result, the combination of a transmit/receive on the same channel will have a directionality polar plot that is the square of either the transmit or receive directionality polar plot. Therefore, the emitter channel will generally only be sensitive to a reflected signal from objects directly in front of it, and will reject ultrasound scattered at an oblique angle. Accordingly, the emitter in such applications will tend to reject noise signals that are reflected from an object in front of the emitter. To use the same emitter channel (a row/column overlap) as both transmit and receive for the ultrasonic pulse may require low impedance in transmit mode and high impedance in receive mode for optimal signal.

Each emitter channel (e.g., each area of row/column overlap) can operate in either continuous or pulsed wave mode, to record data such as time of flight between transmission and reception, which gives an indication of the distance between the object and the emitter (Z coordinate). This can also give an indication of the Doppler shifted frequency, which would give information such as the z-velocity of the object. The X and Y coordinates of an object in space in the Z direction can be determined by scanning through the combinations of row/column overlap, and by using suitable signal processing to determine the channel receiving the strongest signal. Motion of the object across the emitter can be detected by tracking the signal as it moves from channel to channel across the matrix of channels.

Accordingly, motion of an object in space in the X, Y, and Z can be tracked which may, in various embodiments, be used to track gestures, to provide a touch-free touchscreen panel or for other purposes.

The device could be integrated in front of a standard display of a content device (e.g., an LCD, LED, AMOLED or other display), thus giving a monitor, television or other display screen precise X,Y,Z coordinate data of a user, or other object's, location. This data could then be processed to perform a certain action, or command, in response to the detection of an object and/or gesture. The information could be used in conjunction, or instead of, an alternate system such as a single or stereo camera. Embodiments may be implemented to detect objects in ranges from 1 cm or less, to 5 meters away from the emitter, with a z resolution of about 1 mm in the pulsed mode.

An alternative configuration is shown in FIGS. 12 and 13. Instead of rows/columns, the emitter could be formed by patterning a solid planar conductor on one side, which can be, for example, a common (uniform) conductor. The other side can be patterned as a plurality of discrete "emitters" (shown as squares in the example of FIG. 12). As shown in FIG. 13, each discrete emitter can be configured as an individually addressable unit (IAU) 1312 and can be connected to drive/detection circuitry via conductors such as, for example, a finely printed metallic bulbar. Each IAU could be grouped by function, with for example, a 5×5 region having 24 transmit emitters and one receive emitter. The sensitivity of the emitter in transmit mode scales with the number of IAUs, but the sensitivity of the device in receive mode does not. Therefore, a small fraction of the IAUs can be dedicated to receive functionality without loss of range finding sensitivity or audio output (if device is being used as an audio source), thereby freeing up the remaining IAUs to service ultrasonic transmitters. The number of IAUs devoted to receive will determine the X/Y spatial resolution desired in the device. The receive IAUs would detect ultrasonic carrier created by the transmit IAUs, and need only detect at a single frequency (for example, at the transmit frequency, which may be at or near the resonant frequency of the emitter). The sub-division of an emitter into multiple discrete IAUs could also enable surround sound audio effects using beam steering. For example, transmit signals sent to the various IAUs could be phased to enable the beam to be steered using phased array techniques. Different groups of IAUs can be controlled separately from the other groups so that multichannel emitter with independent beam steering per channel can be realized.

IAUs could be realized by individually patterned regions of conductor (e.g., ITO) on the backplate, each connected by a thin metal wire to external circuitry. In various embodiments, the connection wires would be thin enough to not interfere with the transparent nature of the emitter. The IAUs could also be realized by more conventional passive or active matrix designs. In the example of FIG. 13, each smaller square represents ITO, and the shaded areas between the squares represent etched ITO. The lines connecting each IAU are very thin metal conductors. Voltage can be separately applied to each of these lines, while the other side (not shown) may be implemented as a uniform conductive film held at a constant ground.

In another method of operation, each IAU could be configured to both send and receive signals as was described above in the row/column implementation. In embodiments employing this capability, each IAU may be configured to act as an independent range finder, both transmitting pulses and measuring a return signal.

Generally, complete independent operation of each IAU uses independent electronics to control the transmit and receive operations of the devices. If desired, this could be avoided in various embodiments by using an analog storage circuit to store time/frequency information in the return signal. In this mode, all IAUs may be pulsed at once to create an outgoing wave. The IAUs would then be switched to a detection circuit where each IAU is connected to a simple analog circuit designed to detect the return signal timing and store it for readout. An analog-to-digital converter could then be used to sweep through each individual circuit and measure the time-value stored therein in a manner similar to the operation of CCD cameras. This constructs a complete picture of the area in front of the panel.

While the z-detection is taking place, x,y detection is occurring simultaneously. Z-detection functions on the same principles as parametric sound and the same strategies described above to allow simultaneous operation with x,y touch apply to z-detection.

As described above, various embodiments incorporate touch capabilities into an ultrasonic audio emitter, including transparent ultrasonic audio emitters. However, alternative embodiments can be configured to implement a touch panel without these parametric audio capabilities. This can include a touch panel that cannot only since the X and Y coordinates of a touch but also the Z distance and Z velocity of an event. Implementing a touch panel as a standalone panel without parametric audio capabilities can be advantageous. The signal required to drive air non-linear is high, up to 135+dB of ultrasound. On the contrary, the ultrasonic transmit signal needed to detect an ultrasonic echo is much lower, on the order of 100 times (40 dB) lower. Therefore, the emitter would require substantially lower drive voltages, and consume lower power if it were not required to also transmit ultrasonic audio. Also, because range-finding is less complex and more tolerant to distortion, electronic audio signal processing performed by an expensive DSP is no longer required. Also, the requirement of only a single carrier frequency reduces the complexity. Further, signal linearization by the use of a DC voltage offset is also not required. The emitter can be driven at a half frequency of the carrier, improving optics/transparency as well as elimination of a "bias board" or other means for producing such a DC voltage.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. An integrated transparent ultrasonic audio speaker and touchscreen panel, comprising:
    a first transparent layer of the integrated transparent ultrasonic audio speaker and touchscreen panel comprising a first base layer and a first conductive layer; and
    a second transparent layer of the integrated transparent ultrasonic audio speaker and touchscreen panel disposed adjacent the first transparent layer of the integrated transparent ultrasonic audio speaker and touchscreen panel, the second transparent layer of the integrated transparent ultrasonic audio speaker and touchscreen panel comprising a second base layer and a second conductive layer;
    wherein the second transparent layer is a touchscreen for detecting the presence of a touch, while driving the integrated transparent ultrasonic audio speaker and touchscreen panel to produce an ultrasonic audio signal.

2. The integrated transparent ultrasonic audio speaker and touchscreen panel of claim 1, wherein the second transparent layer is disposed behind the first transparent layer.

3. The integrated transparent ultrasonic audio speaker and touchscreen panel of claim 2, wherein the first transparent layer comprises materials of sufficient flexibility such that pressure from touchscreen activities can cause sufficient pressure on the second transparent layer to allow the second transparent layer to sense touch activity imparted on the first transparent layer.

4. The integrated transparent ultrasonic audio speaker and touchscreen panel of claim 3, wherein the first transparent layer comprises a glass, mylar or other transparent sheet that is sufficiently flexible to allow force of a user's touch to be transmitted to the second transparent layer.

5. The integrated transparent ultrasonic audio speaker and touchscreen panel of claim 1, wherein the second transparent layer is an outer layer of the integrated transparent ultrasonic audio speaker and touchscreen panel.

6. The integrated transparent ultrasonic audio speaker and touchscreen panel of claim 5, wherein the second transparent layer comprises a capacitive touch panel.

7. The integrated transparent ultrasonic audio speaker and touchscreen panel of claim 1, wherein the integrated transparent ultrasonic audio speaker and touchscreen panel is disposed on a face of a content device to allow parametric audio content to be provided to a device user.

8. The integrated transparent ultrasonic audio speaker and touchscreen panel of claim 1, wherein the integrated transparent ultrasonic audio speaker and touchscreen panel is positioned over part or all of a content device's display.

9. The integrated transparent ultrasonic audio speaker and touchscreen panel of claim 1, wherein the integrated transparent ultrasonic audio speaker and touchscreen panel is provided in place of the content device's display.

10. The integrated transparent ultrasonic audio speaker and touchscreen panel of claim 1, wherein the second transparent layer comprises a conductive pattern and wherein the conductive pattern provides touchscreen functions and is used to generate an ultrasonic audio signal.

11. The integrated transparent ultrasonic audio speaker and touchscreen panel of claim 1, wherein the second transparent layer comprises a procap touch panel.

12. The integrated transparent ultrasonic audio speaker and touchscreen panel of claim 1, wherein the second conductive layer comprises a patterned conductor used to provide touchscreen detection and to form a conductive layer for ultrasonic audio emission.

13. A method for operating an integrated transparent ultrasonic audio speaker and touchscreen panel, comprising:
    for a conductive layer of the integrated transparent ultrasonic audio speaker and touchscreen panel having a plurality of overlapping rows and columns of conductive material, scanning possible combinations of rows and columns one at a time to detect the presence of a touch; and
    while the scanning is occurring, driving remaining rows and columns of the conductive layer to produce an ultrasonic audio signal.

14. The method of claim 13, wherein the driving comprises driving remaining rows and columns of the conductive layer to produce an ultrasonic signal, and the scanning comprises measuring a driving signal in the scanned row and column to determine whether the driving signal indicates the presence of a touch.

15. The method of claim 13, further comprising pulsing row/column combinations of the conductive material with an acoustic ultrasonic pulse, the integrated transparent ultrasonic audio speaker and touchscreen panel detecting a reflection of the acoustical ultrasonic pulse from an object, determining a distance of the object from the panel.

\* \* \* \* \*